P. D. CROSBY.
Thill Coupling.
No. 95,093.            Patented Sept. 21, 1869.
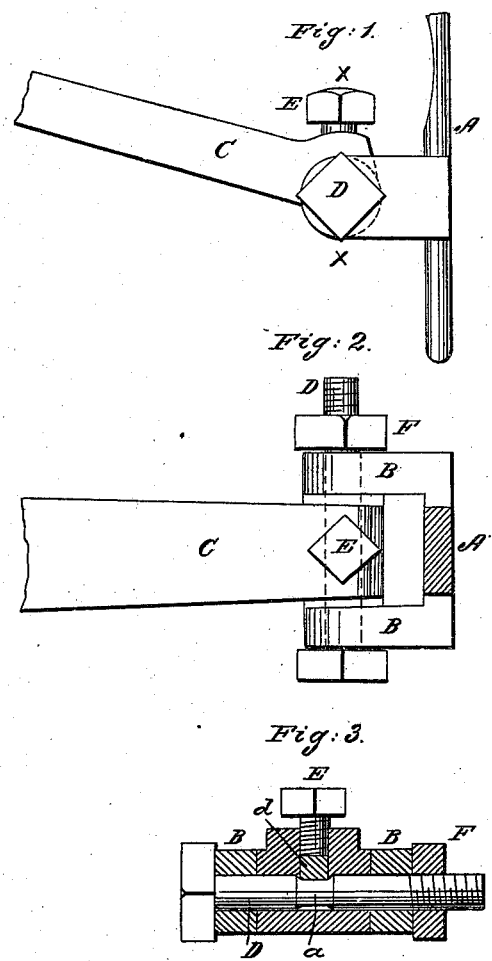

United States Patent Office.

PHINEAS D. CROSBY, OF DANBURY, CONNECTICUT.

Letters Patent No. 95,093, dated September 21, 1869; antedated September 11, 1869.

IMPROVED THILL-COUPLING.

The Schedule referred to in these Letters Patent and making part of the same.

*To all whom it may concern:*

Be it known that I, PHINEAS D. CROSBY, of Danbury, in the county of Fairfield, and State of Connecticut, have invented a new Improvement in Carriage-Shackles; and I do hereby declare the following, when taken in connection with the accompanying drawings, and the letters of reference marked thereon, to be a full, clear, and exact description of the same, and which said drawings constitute part of this specifications, and represent, in—

Figure 1, a side.
Figure 2, a top view.
Figure 3, a section on line $x\ x$.

This invention relates to an improvement in attaching shafts to carriage-axles, known to the trade as "carriage-shackles," the object of the invention being to prevent the rattling of the shafts, as also to prevent the accidental removal of the bolt which secures the shafts to the axle; and The invention consists in forming upon the bolt an annular groove or notch, into which said groove or notch, a piece of India rubber, or similar material, is forced, by a set-screw through the head of the thill-iron.

To enable others to construct and use my improvement, I will proceed to describe the same, as illustrated in the accompanying drawings.

A is the clip, upon which are formed two ears, B B, in the usual manner.

C, the thill-iron, the head of which is constructed so as to fit between the ears of the shackle; and through the two ears and the head, a hole is formed to receive the bolt D. In the said bolt an annular groove, $a$, (see fig. 3,) is formed; and through the thill-iron, and over the said groove, a hole is bored and tapped, to receive the set-screw E; and into the said hole, beneath the set-screw, is placed a piece of rubber or similar material, $d$, so that the said set-screw will press the said material $d$ into the groove in the bolt, which will prevent the accidental removal of the bolt D, while it will allow the thill-iron to turn freely thereon. A pressure of the packing will at the same time prevent the rattling of the shafts.

I place a nut, F, upon the end of the bolt D, in the usual manner, as additional security.

The groove in the bolt to receive the pressure of the set-screw, need not extend around the bolt, and may be arranged to receive the set-screw directly, without the intervention of the packing $d$, but in this case the rattling would not be so effectually prevented.

I do not broadly claim forming a recess in the bolt, so as to retain the same in place by means of a set-screw, as such, I am aware, is not new.

Having, therefore, thus fully described my invention,

What I claim as new and useful, and desire to secure by Letters Patent, is—

A carriage-shackle, in which the bolt D is constructed with a groove or notch, $a$, in combination with the packing $d$ and screw E, the whole constructed, arranged, and operating substantially in the manner specified.

PHINEAS D. CROSBY.

Witnesses:
M. SOL. CROSBY,
H. T. BLAKE.